June 13, 1961

K. J. MAGNUSSON 2,988,595

FACSIMILE SCANNING SYSTEM

Filed April 1, 1958

INVENTOR.
KNUT J. MAGNUSSON

BY

*J. F. Sheehan*

ATTORNEY

June 13, 1961 K. J. MAGNUSSON 2,988,595
FACSIMILE SCANNING SYSTEM
Filed April 1, 1958 2 Sheets-Sheet 2
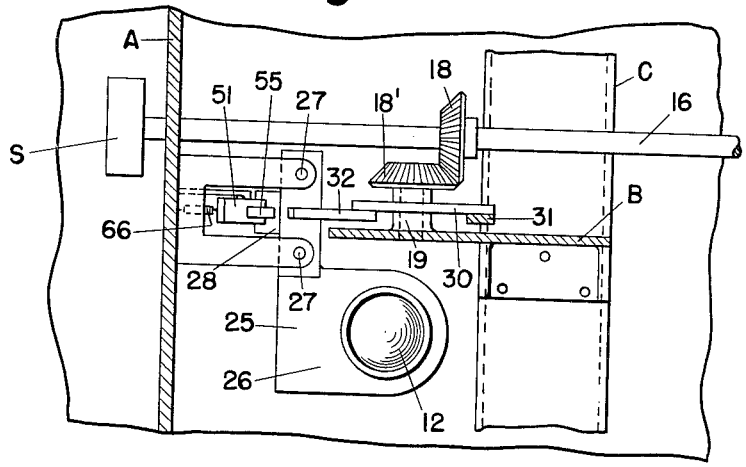
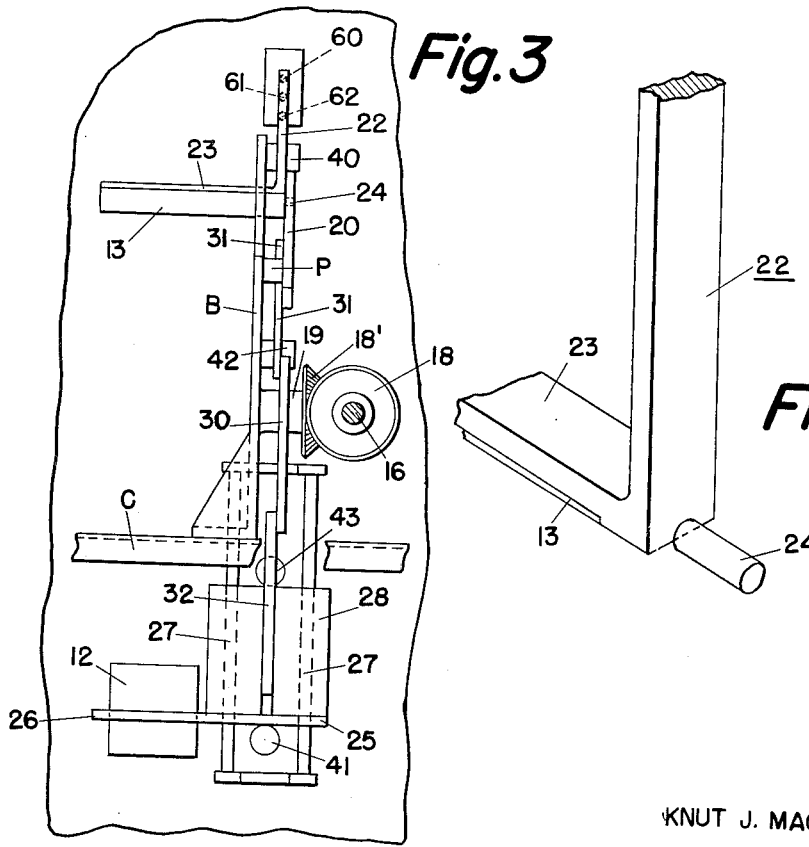
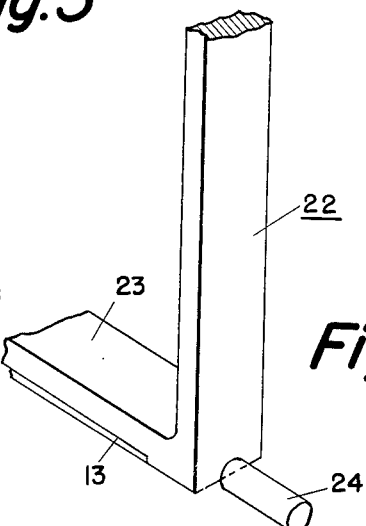
INVENTOR.
KNUT J. MAGNUSSON
BY
ATTORNEY

United States Patent Office 2,988,595
Patented June 13, 1961

2,988,595
FACSIMILE SCANNING SYSTEM
Knut J. Magnusson, Princeton, N.J., assignor, by mesne assignments, to the United States of America as represented by the Secretary of the Navy
Filed Apr. 1, 1958, Ser. No. 725,763
2 Claims. (Cl. 178—7.6)

This invention relates generally to a facsmile transmission optical system and more particularly to apparatus which is adapted for scanning copy of varying sizes.

The invention is directed to a facsimile scanner of the electro-mechanical-optical type which is used for the transmission of page copy, maps, photographs, sketches, etc. for reproduction. The copy to be transmitted is secured to a rotatable scanning drum and the copy is scanned by an optical system having a source of light, the beams of which are focused through a lens onto a mirror and then reflected from the mirror to the copy from which it is directed to a photocell. The light beams from a constant source, such for example, as a cathode ray tube, are concentrated or directed onto a small portion of the copy by the lens and mirror components of the optical system and as the drum rotates, the area of information on the copy being scanned will deflect different amounts of light to the photocell depending on the degree of lightness or darkness of the scanned copy. The photocell and its auxiliary modulator circuits change each degree of light into its equivalent electrical signal for usable reproduction of the copy.

In straight line optical systems, control of the scanning can be effected by adjustment of any two movable elements of the system, i.e., the cathode ray tube face, lens or copy, while in the folded optical system, relative adjustment of the lens and mirror will usually suffice to provide the desired scanning. In either system, expensive auxiliary adjustment equipment has been required to be used. Prior arrangement for varying the relative positons of the elements of a scanning system, such as, the cathode ray tube face, lens or mirror in accordance with variations in the width of the copy have used intricate and expensive cams to make the required fine adjustments of the various elements but these have been found not to be very effective.

Accordingly, the broad object of the invention is to provide an inexpensive yet effective arrangement for the simultaneous movement of the several elements of the optical system by an operator.

It is another object of the invention to provide a system of linkage or levers between the elements of the optical system which are simultaneously and readily controlled by an operator for effecting the desired adjustment.

Another object of the invention is to provide a system of levers or linkage between the elements of the optical system which permits the elements to be relatively adjusted to predetermined limits.

Still another object is to provide in addition to the leverage system auxiliary adjustment means for effecting desired fine adjustment of the several elements.

These and other objects of the invention will become apparent from the following detailed description taken in connection with the drawings, wherein:

FIG. 2 is an enlarged view taken along the line 2—2 of FIG. 1;

FIG. 3 is a view taken generally along the line 3—3 of FIG. 1 with some elements enlarged to show details; and FIG. 4 shows a detail of an element of the invention.

Figure 1:
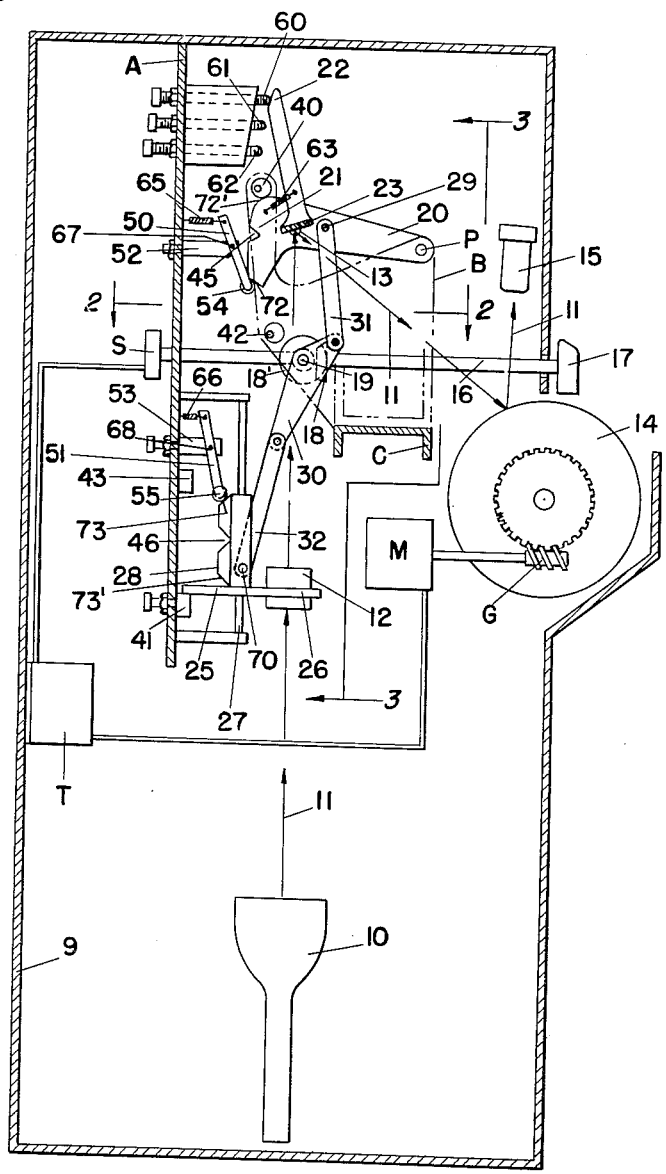
FIG. 1 is a view of the interior of the housing for a scanning device showing some elements of the apparatus diagrammatically and other elements in detail.

In FIG. 1, a housing 9 encloses a cathode ray tube 10 which is provided with a ray generating and deflecting means to emit a constant light beam indicated at 11 and shown in interrupted lines. The light beam 11 is directed to a lens 12 and focused onto a mirror 13, and as indicated by the arrows on the interrupted lines, the light beam 11 is reflected from the mirror onto a copy (not shown) but which will be secured to a rotatable scanning drum 14. The light beam 11 is then deflected into a photocell 15 from which by modulator circuits (not shown) the light will be transformed into electrical signals for reproduction of the copy.

The lens 12 and mirror 13 are arranged for simultaneous movement by an operator in order to vary their relative positions and to this end a shaft 16 extends across the housing and has an actuating knob 17, disposed exteriorly of the front wall of the housing and the other end of shaft 16 extending through and supported by a panel A; which is supported by a side wall of the housing. The shaft 16 is provided with a beveled gear 18 intermediate its ends which coacts with a companion gear 18'.

The companion gear 18' is mounted on a support plate B by means of a shaft 19 and the plate B in turn is supported by a channel iron C which extends transversely of the shaft 16 and is positioned between opposed side walls of the housing as is shown in some detail in FIGURE 2. The supporting plate B is shown in FIGURE 1 in phantom lines since as will be evident from FIGS. 2 and 3 it is positioned in front of the elements which it supports. The plate has its lower edge portion welded or otherwise secured to the top of channel iron C and is irregular in shape to accommodate movable elements of the device as will be later described for relatively moving the lens 12 and mirror 13.

A rocker arm 20 provides a support for the mirror and has one end pivotally mounted at P to the plate B, while its opposite end provides an upper cam surface. An L-shaped bracket is formed of an arm portion 22 and a leg portion 23, as is shown in detail in FIG. 4. The mirror 13 is disposed on the outer face of the leg portion 23 and a lug 24 is provided for reception in an aperture in the rocker arm 20 to permit pivotal adjustment of the mirror relative to the rocker arm. Pivotal movement of the rocker arm 20 about point P will cause the mirror to move in a curvilinear or arcuate path. Thus the pivotal movements of the mirror will adjust its angle of reflection of the light beam. The lens 12 is arranged for linear movement toward or from the mirror and to this end the carriage 25 has an extension 26 which mounts the lens 12 as shown in FIG. 2. The carriage 25 is mounted on vertical posts or guides 27—27 and has formed integrally therewith a lower cam or cam surface shown generally at 28.

The upper cam 21 and lower cam 28 are interconnected by a central lever 30 and upper and lower links 31 and 32 respectively. The central lever 30 is pivotally mounted to shaft 19 and one end of each link 31 and 32 is pivotally mounted to lever 30 while the other ends of the links 31 and 32 are respectively pivotally mounted to rocker arm 20 for moving the upper cam 21 and directly to lower cam 28.

From the prior description, it will be seen that rotation of the shaft 16 by an operator, will, through the bevel gears 18 and 18', actuate central lever 30 which in turn will actuate the upper and lower links 31 and 32 respectively. Upper cam 21 will move in an arcuate path and lower cam 28 will move in a vertical path toward each other, that is, from the position shown in FIG. 1.

The cams 21 and 28 in FIG. 1 are shown in their limit of extended movement away from each other and likewise the lens 12 and mirror 13 are shown in their extended position. In this position the upper cam 21 is in contact with an outer stop 40 carried by the plate B and the lens carriage 25 is in contact with a second outer stop 41. The mirror and lens will be moved toward each other to their extreme contracted position by rotation of the shaft 16 and through the lever 30, and links 31 and 32 the rocker arm 20 will pivot downwardly and the upper cam 21 will contact the inner stop 42 on the plate B and the lens carriage 25 will contact a second inner stop 43.

The cams 21 and 28 as shown are respectively notched at 45 and 46 which determine an intermediate point between the ends of the cams. These intermediate points may be selected to position the lens 12 and mirror 13 as desired between their expanded and contracted positions.

In order to maintain the lens and mirror in the intermediate position after they are moved by rotation of shaft 16, separate detent levers 50 and 51 are provided and are respectively pivotally mounted to posts 52 and 53 which are supported by panel A. The levers 50 and 51 carry detents or cam followers 54 and 55 which repose in the notches 45 and 46 when the lens and mirror are in their intermediate positions. The detents abut the surfaces 72 and 73 of the cams 21 and 28 respectively when the lens and mirror are in their extended positions as shown in FIG. 1 and will abut the other or opposite surfaces 72' and 73' of the cams when in their contracted positions.

The free end of arm 22 which mounts the mirror 13 selectively abuts any one of three adjustment screws, or rods, 60, 61, or 62 depending upon whether the system is in the extended, intermediate or contracted position and the screws function to vary the angle of reflection of the mirror 13.

Tension spring 63, one end of which is attached to arm 22 and the other end attached to rocker arm 20, urges the free end of arm 22 against any one of the adjustment screws which may conveniently be supported by any suitable mounting as shown.

Adjustment of lens and mirror assemblies will be determined by the width of the scanned copy carried by drum 14. Where the ratio of scanned copy width is considerably greater than the cathode ray tube scanning length, the positioning of the mirror and lens will be as shown in FIG. 1. As this ratio becomes smaller, the mirror and lens are moved closer toward their contracted positions.

Posts 52 and 53 are vertically slidable on panel A, providing for additional fine adjustments. Cam followers 54 and 55 are held in constant frictional engagement with the surfaces of cams 21 and 22 by means of tension springs 65 and 66 since the detent levers 50 and 51 are pivotally secured to their respective posts at 67 and 68.

Links 31 and 32 are provided with oversize holes at their outer ends 29 and 70 respectively to provide lost motion connections so that movement of the levers by the control shaft 16 merely brings the mirror and lens to their approximate position, but within range for cam followers 54 and 55 to take over and by their contact with beveled surfaces 72 and 73 of the cams 21 and 28 respectively, the lens and mirrors are properly and relatively adjusted. Cam follower 55, in moving over beveled surface 73, exerts a downward thrust on cam surface 28 forcing lens carriage 25 against outer stop 41. This movement is facilitated through the oversize hole means at 70. The oversize hole means at 29 operates in a generally similar but opposed manner. Since the rocker arm is subjected to curvilinear displacement as well as vertical movement, outer stop 40 and inner stop 42 are eccentrically rotatably mounted to plate B to facilitate final adjustment therewith.

The traverse speed of rotating drum 14 must be changed to compensate for various scanning width of copies. In order to correlate drum speed with the lens and mirror adjustments on various width copies, shaft 16 is additionally provided with a multi-position switch S, having a plurality of contacts and which is connected with a variable transformer T having a plurality of taps. This provides a means for controlling the speed of motor M as desired which in turn through suitable gearing G effects the rotation of drum 14.

While there is herein shown a specific embodiment of the invention, it is to be understood that the invention may readily be adaptable to accommodate copies of varying widths and that modifications may be made for that purpose without departing from the spirit of the invention which is to be limited only by the scope of the appended claims.

What is claimed is:

1. An optical scanning system comprising a fixed cathode tube for emitting a light beam, a mirror spaced from said tube and positioned to reflect the light beam to a scanning drum, a lens disposed in the path of the light beam between and in spaced relation with both said tube and mirror, a first support for said mirror mounted for pivotal movement to adjust the angle of reflection of the mirror, a second support for said lens mounted for linear movement toward and away from the mirror, linkage between said first and second supports comprising a central lever and a pair of end links, a fixed support providing a pivotal mounting for the central lever, one link being pivoted to the central lever on one side of said pivotal mounting and the other link being pivoted to the central lever on the other side of said pivotal mounting, said one link having a first lost motion connection with said first support, said other link having a second lost motion connection with said second support, an operating shaft, gear means between the operating shaft and the pivotal mounting of the central lever for actuating the linkage to simultaneously effect an initial movement of the first and second supports, a first biasing means effective after the initial movement of the first support to effect a second movement of the first support through the first lost motion connection and a second biasing means effective after the initial movement of the second support to effect a second movement of the second support through the second lost motion connection.

2. A scanning system as in claim 1, further characterized by said first support having a first cam surface and said first biasing means including cam follower means in constant contact with the first cam surface and said second support having a second cam surface and said second biasing means including other cam follower means in constant contact with said second cam surface.

References Cited in the file of this patent

UNITED STATES PATENTS

| | | |
|---|---|---|
| 2,287,413 | Bruce | June 23, 1942 |
| 2,437,898 | Swanson | Mar. 16, 1948 |
| 2,666,094 | Young | Jan. 12, 1954 |
| 2,778,873 | Nyman | Jan. 22, 1957 |